(12) United States Patent
Walden et al.

(10) Patent No.: US 11,362,880 B2
(45) Date of Patent: Jun. 14, 2022

(54) NETWORK-OPERATING METHOD IN WHICH A QUERY IS BROADCAST BY SNMP PROTOCOL

(71) Applicants: Andreas Walden, Pliezhausen (DE); Markus Seehofer, Rechberghausen (DE)

(72) Inventors: Andreas Walden, Pliezhausen (DE); Markus Seehofer, Rechberghausen (DE)

(73) Assignee: HIRSCHMANN AUTOMOTIVE GMBH, Rankweil/Brederis (AT)

( * ) Notice: Subject to any disclaimer, the term of this patent is extended or adjusted under 35 U.S.C. 154(b) by 0 days.

(21) Appl. No.: 16/605,000

(22) PCT Filed: May 8, 2018

(86) PCT No.: PCT/EP2018/061931
§ 371 (c)(1),
(2) Date: Oct. 12, 2019

(87) PCT Pub. No.: WO2018/206609
PCT Pub. Date: Nov. 15, 2018

(65) Prior Publication Data
US 2020/0177434 A1 Jun. 4, 2020

(30) Foreign Application Priority Data
May 12, 2017 (DE) ...................... 10 2017 110 344.9

(51) Int. Cl.
*G06F 15/173* (2006.01)
*G06F 15/177* (2006.01)
*H04L 41/0213* (2022.01)
*H04L 41/0803* (2022.01)
*H04L 41/085* (2022.01)
*H04L 69/325* (2022.01)

(52) U.S. Cl.
CPC ...... *H04L 41/0213* (2013.01); *H04L 41/0803* (2013.01); *H04L 41/085* (2013.01); *H04L 69/325* (2013.01)

(58) Field of Classification Search
CPC ............. H04L 41/0213; H04L 41/0803; H04L 41/085; H04L 69/325
USPC ................. 709/220–222, 223–224, 245–246
See application file for complete search history.

(56) References Cited

U.S. PATENT DOCUMENTS

| | | | |
|---|---|---|---|
| 7,054,314 B2 | 5/2006 | Abdollahi | |
| 8,085,790 B2 * | 12/2011 | Kiessig | ............... H04L 12/4658 370/398 |
| 8,531,985 B2 * | 9/2013 | Rao | ..................... H04L 47/6215 370/252 |

(Continued)

*Primary Examiner* — Bharat Barot
(74) *Attorney, Agent, or Firm* — Andrew Wilford

(57) ABSTRACT

The invention relates to a method for operating a network, wherein at least two network devices are connected to one another in the network via a data line and exchange data via this data line, wherein each network device is fixedly assigned an independent MAC address, wherein a network management station also controls the configuration and/or the operation of the network, characterised in that a query is sent from the network management station by multicast by means of the SNMP protocol to the network devices so as to query the configuration parameters of the network devices and/or configure the queried network device by SNMP.

9 Claims, 2 Drawing Sheets

(56) References Cited

U.S. PATENT DOCUMENTS

Figure 1:
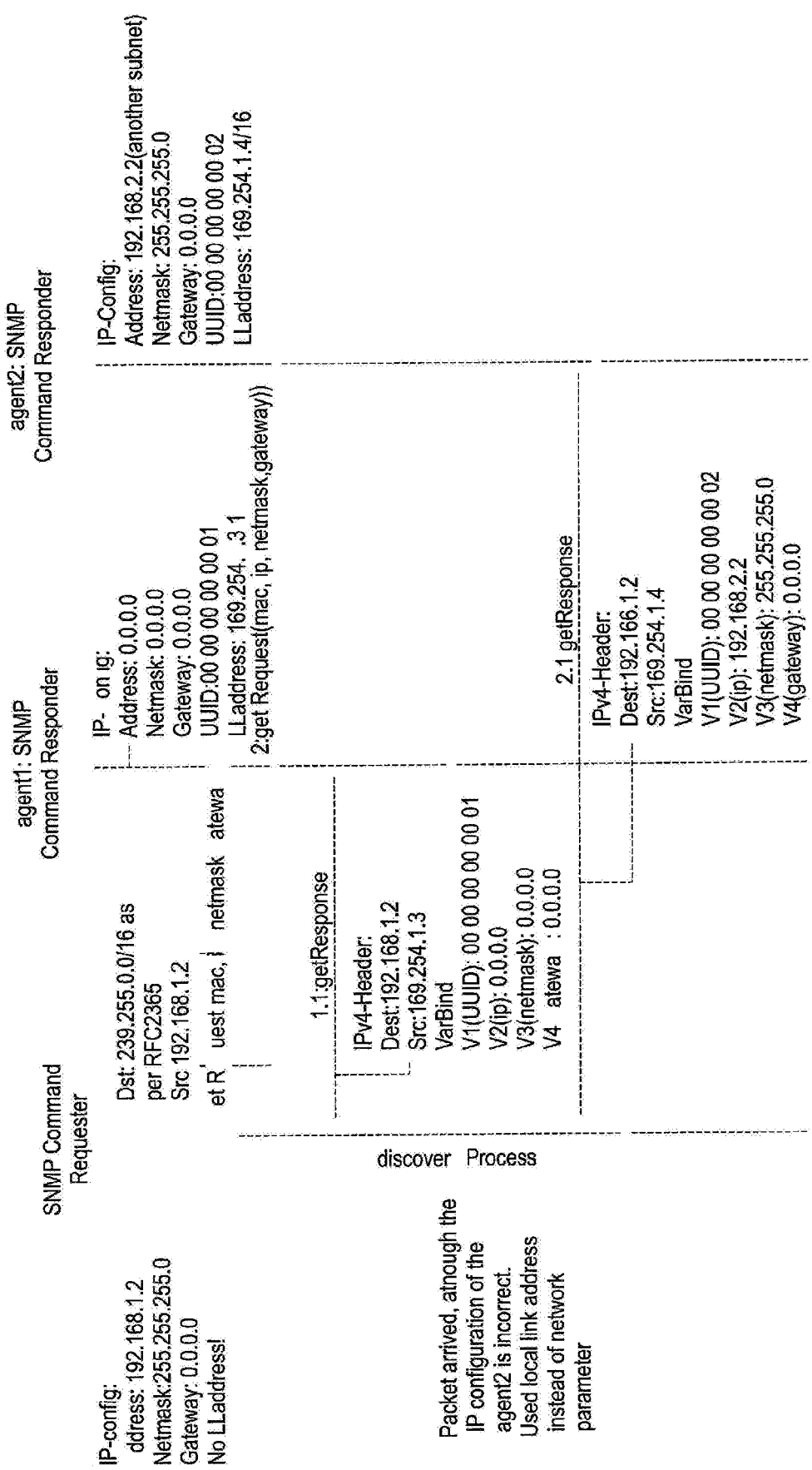

| | | | |
|---|---|---|---|
| 8,549,119 B1* | 10/2013 | Singh | H04L 41/0853 |
| | | | 709/223 |
| 8,867,067 B2* | 10/2014 | Maekawa | H04N 1/00204 |
| | | | 358/1.15 |
| 9,270,533 B2 | 2/2016 | Krishna | |
| 2004/0095897 A1* | 5/2004 | Vafaei | H04L 67/16 |
| | | | 370/254 |
| 2005/0138157 A1* | 6/2005 | Jung | H04L 41/12 |
| | | | 709/223 |
| 2009/0279454 A1* | 11/2009 | Wacker | H04L 41/0806 |
| | | | 370/255 |
| 2015/0113564 A1* | 4/2015 | Mushikabe | H04L 12/2814 |
| | | | 725/37 |
| 2020/0313973 A1* | 10/2020 | Nakagawa | H04L 41/12 |

\* cited by examiner

NETWORK-OPERATING METHOD IN WHICH A QUERY IS BROADCAST BY SNMP PROTOCOL

CROSS REFERENCE TO RELATED APPLICATIONS

This application is the US-national stage of PCT application PCT/EP2018/061931 filed 8 May 2018 and claiming the priority of German patent application 102017110344.9 itself filed 12 May 2017.

The invention relates to a method of operating a network where at least two network devices in the network are connected to one another via a data line and interchange data via this data line, where an independent MAC address is permanently assigned to each network device, and where a network management station also controls the configuration and/or operation of the network, according to the features of the preamble of patent claim 1.

Networks in which two or generally more than two network devices (also referred to as network infrastructure devices) are arranged in a ring or line topology and interchange data with one another are fundamentally known. Data are interchanged via data lines, via which the network devices are connected to one another. These data lines may be cables or else wireless connections, for example radio connections.

In practice, there is the problem of either a new network, which has been constructed from a plurality of network devices, having to be configured or, in an existing network, the entire configuration or its configuration partially (for example if a network device is replaced) having to be changed or updated. This is carried out by a network management station that is suitably connected to all network devices. The network management station can query the respective MAC address of the network devices or receives it from the network devices via the data lines. The network management station therefore initially fundamentally knows that, although there are network devices in the network, their configuration has either not yet been carried out at all or is incomplete or even incorrect.

The invention is therefore based on the object of improving a method of operating a network with respect to the activation of the network and/or operation. In particular, all network devices in a network are intended to be identified. In this respect, in particular, network devices that have not yet been configured at all (that is to say new network devices before their activation or after replacing a defective network device) or possibly network devices that have not been correctly configured are intended to be identified and addressed.

This object is achieved by the features of patent claim 1.

The invention provides for the network management station to send a request to the network devices (to predetermined network devices or to one or more groups of network devices) by multicast using the SNMP protocol in order to query the configuration parameters of the network devices and/or to configure the requested network devices by SNMP.

The respective requested network device is therefore changed to the transmitted configuration using the SNMP protocol. In addition, a respective queried network device can return its configuration parameters to the network management station by unicast using the SNMP protocol.

The method uses the knowledge that the SNMP (Simple Network Management Protocol) protocol can monitor and control network devices (for example computers, printers, routers, servers, switches and the like) from a central network management station. In this case, this protocol controls communication between the monitored network devices and the network management station. This protocol has become established in the meantime and can be used to interchange data, in particular configuration data, between the network management station and the respective network device. In this case, use is made of the commands "get" to request a management data record and "set" to change one or more data records of a network device. If the network management station queries a network device, this is carried out by the command "request", wherein the response from the network device to the query is effected using the command "response". On the basis of this, the invention also uses the knowledge that not only the request for management data records is carried out by the command "get request" as a multicast, but the response from the queried device is also carried out using the command "get response" as a unicast. The multicast in the network is a message in which data packets are transmitted from one point (the network management station) only to predetermined network devices, rather than to all network devices. The invention here advantageously uses the knowledge that the multicast packet does not reach all network devices in the network, with the result that only particular network devices are addressed, in particular those that are intended to be newly configured or reconfigured.

A development of the invention provides for both the request from the network management station and the return from the requested network device to be carried out on layer 3. This has the advantage that a network device that has not yet been configured can also be requested on the basis of its known MAC address since an IP address has not yet been allocated to it.

In a development of the invention, the actual configuration parameters of the requested network device are nevertheless returned even if the configuration parameters sent by the network management station to the network device do not correspond to the actual configuration parameters of the requested network device. This is carried out taking into account the MAC address of the requested network device, with the result that a plurality of network devices, preferably all network devices, in the network are queried by the network management station and the queried network devices nevertheless respond in order to transmit their configuration data to the network management station in this manner. The network management station therefore requests a respective network device by multicast using the SNMP protocol, whereupon the requested network device responds by unicast and likewise transmits its configuration parameters back to the network management station using the SNMP protocol.

When the actual configuration parameters of the network device do not correspond to the desired configuration parameters required for the intended operation of this network device, a development of the invention provides for the desired configuration parameters to be transmitted to this network device by a further request from the network management station, which desired configuration parameters are then accepted by the requested network device. As a result, it is possible to newly and correctly configure a network device if it has not stored any configuration parameters at all or has stored incorrect configuration parameters in its memory, in particular during initial activation. The same applies to replacing a defective network device that can be quickly configured without any problems in this manner. It is therefore possible for the network management station to transmit the desired configuration parameters required for the intended operation of this network device to this network device so that the latter can store said configuration parameters and can therefore start its operation.

In a development of the invention, the correct acceptance of the desired configuration parameters by the requested network device is returned to the network management station by said network device. As a result, the network management station receives the information that the changed or new configuration of the requested network device has been successfully carried out.

In a development of the invention, the method is carried out for network devices that have not been configured and/or network devices that have been incorrectly configured. The invention therefore provides a method that can be carried out in an uncomplicated and fast manner in order to activate a network for the first time or in order to be able to replace and configure network devices in a network that is already operating.

In a development of the invention, the configuration parameters of the requested network device are returned irrespective of the IP address of this network device set at this time. With the method according to the invention, the network management station can therefore permanently or temporarily assign an IP address to the respective requested network device, which IP address is then fed back to the network management station as set or confirmed by returning it as a unicast via the SNMP.

A development of the invention provides for the network device to be addressed by a Universally Unique Identifier (UUID) inside the SNMP packet. If this (that is to say the transmitted UUID and the UUID stored in the network device) does not correspond, the configuration parameters are rejected, that is to say are not accepted.

The method according to the invention is illustrated in two figures.

It can be seen in FIG. 1 that the method according to the invention is carried out during the activation (initial configuration) of a network device. The method is initiated by the network management station (SNMP command requester) and is carried out in collaboration with a network device (agent1: SNMP command responder) in the manner described above. The method can be carried out not only for a single network device, but also for a plurality of network devices. In order to illustrate this, FIG. 1 shows at least one further network device (agent2: SNMP command responder).

Figure 2:
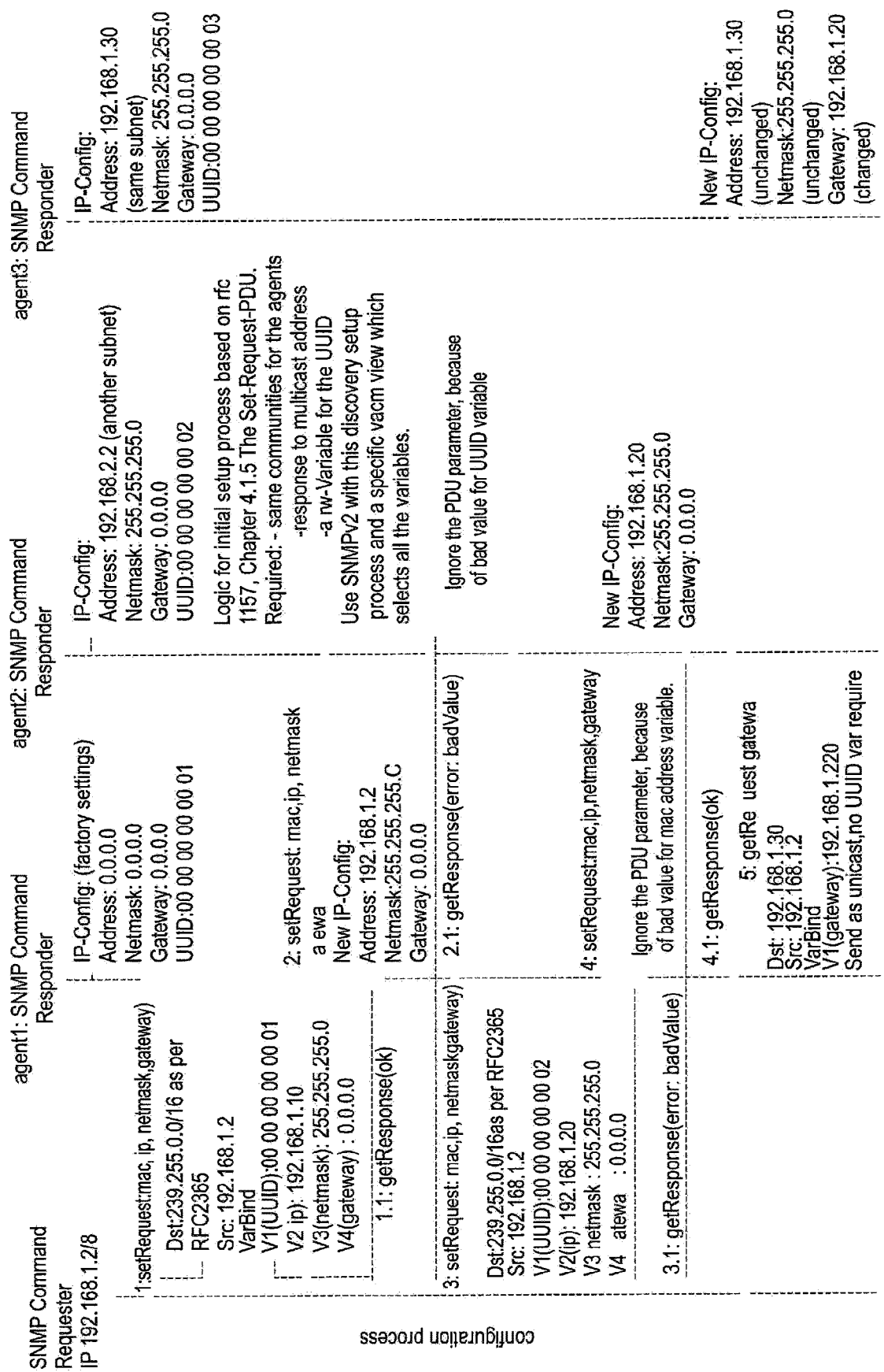

FIG. 2 illustrates that the method according to the invention is carried out when replacing a network device, when changing an already existing configuration or the like. In this case too, the method is initiated by the network management station (SNMP command requester) and is carried out in collaboration with a network device (agent1: SNMP command responder) in the manner described above. Like the method during the initial configuration, the method is not restricted to a single network device, but rather can be carried out on a plurality of network devices, in particular on all network devices, in a network. By way of example, FIG. 2 illustrates a total of three network devices (agent1, agent2, agent3).

The invention claimed is:

1. A method of operating a network, the method comprising the steps of:
   connecting a plurality of network devices in the network to one another via a data line and interchanging data via the data line,
   permanently assigning an independent MAC address to each network device,
   a network management station controlling configuration and/or operation of the network,
   the network management station sending a request packet from one point only to the predetermined network devices of the plurality of network devices by multicast using the simple network management protocol (SNMP) in order to query the configuration parameters of the network devices and/or to configure the requested network devices by the SNMP, and
   addressing each of the network devices by a respective Universally Unique Identifier (UUID) inside the SNMP request packet.

2. The method according to claim 1, further comprising the step of:
   the respective queried network device returning its configuration parameters to the network management station by unicast using the SNMP protocol.

3. The method according to claim 2, further comprising the step of:
   carrying out both the request from the network management station and the return from the requested network device on a layer 3.

4. The method according to claim 2, further comprising the step of:
   returning the actual configuration parameters of the requested network device even if the configuration parameters sent by the network management station to the network device do not correspond to the actual configuration parameters of the requested network device.

5. The method according to claim 3, further comprising the steps, when the actual configuration parameters of the network device do not correspond to the desired configuration parameters required for the intended operation of network device, of:
   transmitting the desired configuration parameters to the network device by a further request from the network management station, and
   the requested network then accepting desired configuration parameters.

6. The method according to claim 4, further comprising the step of:
   returning the correct acceptance of the desired configuration parameters by the requested network device to the network management station.

7. The method according to claim 1, wherein the method is carried out for network devices that have not been configured and/or network devices that have been incorrectly configured.

8. The method according to claim 2, wherein the configuration parameters of the requested network device are returned irrespective of an IP address of currently set in the network device.

9. The method according to claim 1, wherein the predetermined network devices are devices to be newly configured or reconfigured.

* * * * *